April 6, 1937.                G. W. FYLER                 2,076,368
                    HIGH FREQUENCY POWER SUPPLY SYSTEM
                         Filed May 3, 1935
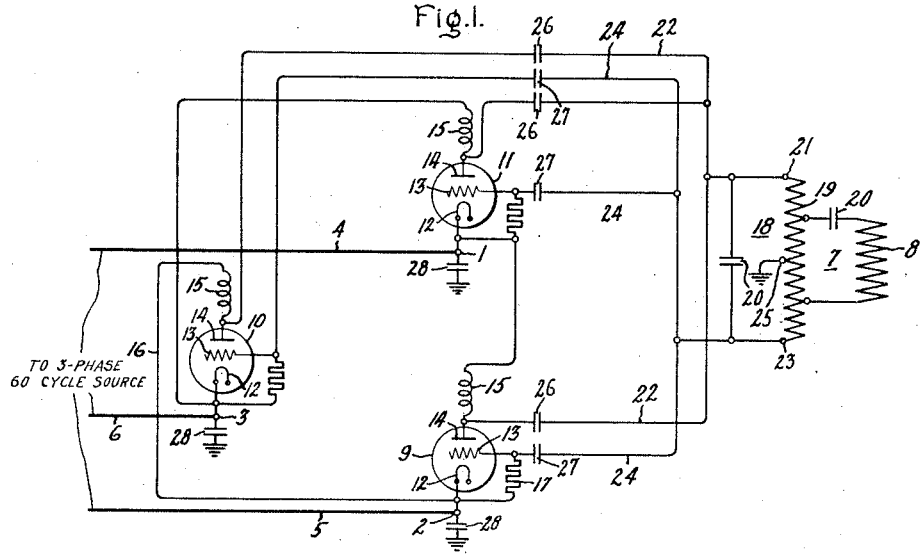
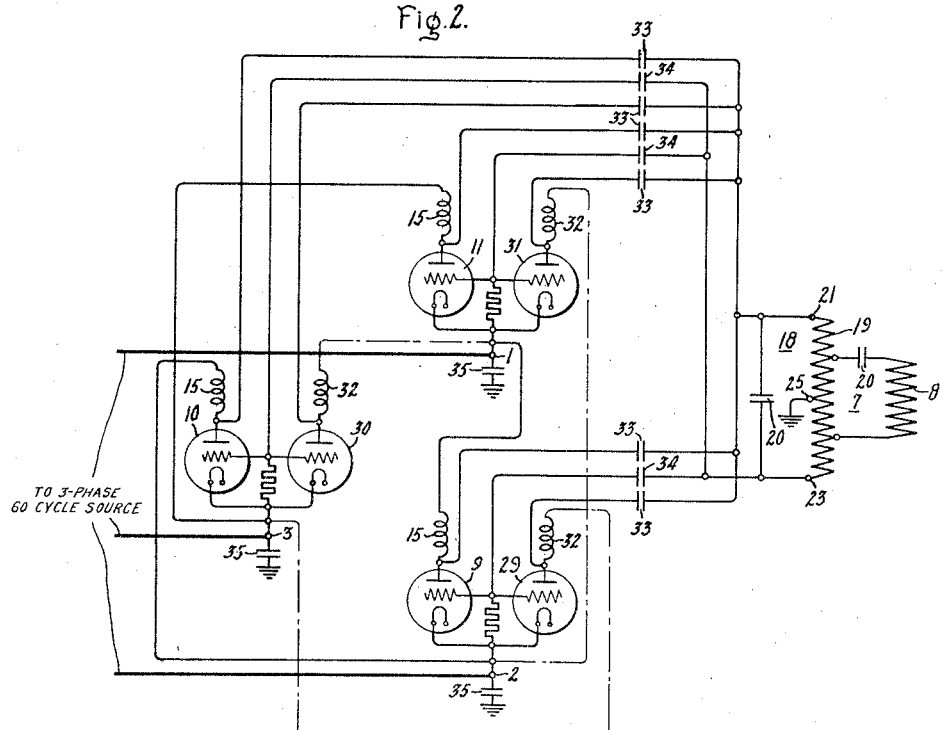
Inventor:
George W. Fyler,
by Harry E. Dunham
His Attorney.

Patented Apr. 6, 1937

2,076,368

UNITED STATES PATENT OFFICE 2,076,368

HIGH FREQUENCY POWER SUPPLY SYSTEM

George W. Fyler, Schenectady, N. Y., assignor to General Electric Company, a corporation of New York Application May 3, 1935, Serial No. 19,712

6 Claims. (Cl. 250—36)

My invention relates to means for supplying electric power at relatively high frequency from commercial frequency power lines, particularly to means for supplying electric power at frequencies of the order of fifty thousand cycles per second to electric induction furnaces or like load circuits, and its object is to provide a self-rectifying oscillator system, to supply power current of the above relatively high frequency from a commercial alternating current line, which is of simplified construction and which operates at high efficiency on electric induction furnace or similar loads.

In previously known self-rectifying circuits for connection to a current supply source such as a three-phase commercial power line, it has been necessary to employ special zig-zag or otherwise connected transformers, or iron core reactors, in order to establish a current return path for direct current produced by the rectification of the alternating supply current. In addition, in other previous self-rectifying circuits of this character, special phase windings have been required for supplying the low frequency voltage to the rectifying tubes or devices. In many cases the apparatus has thereby been rendered unduly complicated and expensive.

In accordance with my present invention the above and other difficulties are avoided by the provision of a self-rectifying system which requires no special phase windings, no neutral point for connection to a return path for direct current and no transformers or iron core reactors, and in which no direct current is present in the supply lines. Further the rectifying tubes are connected directly to the terminals of the alternating current supply line, no phase windings or other like means being required for impressing voltages on the tubes.

In a preferred embodiment of my invention, the system comprises three electron discharge devices or tubes having anodes, control electrodes and cathodes, each tube being connected between a different pair of the terminals of a three-phase power line, each of the three tubes being connected to operate on the power line voltage for one third of the time of one cycle, or for 120 degrees in any one cycle.

The tube electrodes are connected to a single tank or oscillator circuit, the oscillation circuit comprising suitable inductance and capacitance to produce the required high frequency power current. All of the tube electrodes are coupled to the tank circuit by suitable blocking capacitances, of high impedance for the power line frequency, which keep the power line voltage out of the tank circuit and permit grounding of the latter circuit. The cathodes of the tubes are tied together for the transmission of the high frequency in the oscillation circuit by capacitances which have a high impedance for the power line frequency and a low impedance for the high or oscillation frequency. Reactance means such as choke coils of high impedance for the oscillation circuit frequency and low impedance for the power line frequency are provided, connected to the anodes, in the cathode-anode leads to keep the high frequency out of the power lines.

A load circuit which in the present embodiment of the invention is the winding of an electric induction type furnace is connected to the tank circuit.

In this preferred embodiment of the invention, the arrangement is such that each wire, or line, terminal of the power supply line is connected directly to the cathode of one of the tubes and, through a high frequency choke coil or reactor, to the anode of another of the tubes. Each of the three cathodes connected to a line terminal, is, therefore, connected to the anode of the tube, for example, next following the given tube, the cathode of the tube which thus follows the given tube being similarly connected to the next following line terminal.

In a modification of my invention, in addition to the first set of three tubes, a second set of three tubes is provided connected in the same manner as above explained except that each of the cathodes of the second set of tubes is connected through a choke coil or reactor to the anode of the preceding instead of the following one of the tubes. As in the embodiment of the invention comprising three tubes, in the six tube system the electrodes of the tubes are connected to the common single tank circuit through blocking capacitors of high impedance for the power line frequency and of low impedance for the high or oscillation frequency. In the six tube modification of the invention the circuit arrangements are such that each of the six tubes operates for one-sixth of the time of one cycle of the power line frequency or for 60 degrees in one cycle.

My invention will be better understood from the following description when considered in connection with the accompanying drawing and its scope will be set forth in the appended claims.

Referring to the drawing, Fig. 1 is a circuit diagram of a three-tube oscillation frequency system embodying my invention and showing an induction furnace winding, or similar load circuit element, supplied through the oscillation system directly from the line terminals of a three-phase power line. Fig. 2 is a circuit diagram similar to that of Fig. 1 but showing an oscillation system comprising six tubes arranged in two sets of three tubes each.

In Fig. 1, the numerals 1, 2, and 3 designate terminals connected respectively to the three wires or lines 4, 5, and 6 of an alternating current line which in the present embodiment of the invention may be a 2300 volt 60 cycle power line. The numeral 7 designates a load circuit including a winding 8 which may represent the heater winding of an electric furnace of the induction type particularly adapted to heating processes which require power of the order of 100 kw. and of relatively high frequency, for example, a frequency of the order of 50,000 cycles per second.

To supply current of this relatively high frequency the alternating current power line is connected to the winding 8 through an oscillation system including three electron discharge devices or tubes 9, 10, 11, each having a cathode 12, control electrode or grid 13, and anode 14. Each tube is connected between a different pair of the line terminals, tube 9 being shown as connected between terminals 1 and 2 of lines 4 and 5, tube 10 between terminals 2 and 3 of lines 5 and 6, and tube 11 between terminals 3 and 1 of lines 6 and 4.

In order to keep currents of the oscillation frequency out of the low frequency circuits thus formed by tubes 9 to 11 connected respectively between different pairs of the power line wires 4 to 6, a choke coil or reactor 15 is connected to the anode, in the anode-cathode circuit of each tube, the reactors 15 having low impedance for the power supply frequency and high impedance for the oscillation frequency. As shown in the form of the invention illustrated in Fig. 1, each cathode is directly connected to the corresponding line terminal of the power supply line and the choke coil or reactor 15 is connected in a lead 16 connecting the cathode of a given tube, as tube 9, with the anode of a following tube, as tube 10.

A grid leak or grid-to-cathode resistor 17 is connected between each of the cathodes 12 and the corresponding control electrode or grid 13.

In order to induce oscillations or high frequency currents of predetermined frequency and to transmit the high frequency power to the load circuit winding 8, a tank or oscillation circuit 18 is provided including an inductance 19 and a capacitance 20 shunted across the latter inductance. One terminal 21 of inductance 19 is connected for oscillation frequencies through connections including leads 22 to the anodes 14 of tubes 9 to 11, an opposite terminal 23 of inductance 19 is connected through connections including leads 24 to the control electrodes 13, and a central or intermediate terminal 25 of inductance 19 is connected, preferably through ground connections, to the cathodes 12.

To keep the power line frequencies out of the tank circuit 18, blocking capacitances or condensers 26 are connected in the leads 22 between anodes 14 and inductance terminal 21, blocking condensers 27 are connected in the leads 24 between control electrodes 13 and inductance terminal 23, and blocking condensers 28 are connected in the connections between cathodes 12 and inductance terminal 25, the condensers 28 being grounded to permit grounding of the tank circuit 18 at terminal 25, the condensers 26, 27, and 28 being of high impedance for the power line frequency and of low impedance for the oscillation circuit frequency.

To transmit power from the tank circuit 18 to the winding 8 of the furnace or other load element, the winding 8 is connected by any suitable means to the inductance 19.

In Fig. 2, the system comprises in addition to the set of three tubes 9 to 11, an additional set of three tubes 29 to 31 connected to terminals 1 to 3 of the power supply lines. Whereas in the set of tubes 9 to 11 each cathode is connected through a choke coil or reactor 15 to the anode of the following tube, considering the order of current flow in the phases 4 to 6 to be clockwise, in the set of tubes 29 to 31 each cathode is connected through a choke coil or reactor 32 to the anode of the preceding tube. The anodes of both sets of tubes are connected through capacitances 33, of high impedance for the power line frequency and low impedance for the oscillation frequency, to one terminal 21 of the tank circuit inductance 19. The control electrodes of each pair of tubes are connected through capacitances 34, similar to capacitances 33, to the opposite terminal 23 of inductance 19, the central terminal 25 of inductance 19 is grounded, and the pairs of cathodes connected to the line terminals 1 to 3 are grounded for the high frequency through capacitances 35 similar to capacitances 33 and 34.

In operation of the high frequency power supply system illustrated in Fig. 1, voltages from the three-phase 60 cycle source are impressed in turn on the anodes 14 to supply power for the high frequency oscillation system comprising the tubes 9 to 11, the tank circuit 18, and the connections between the tubes and the tank circuit, each of the tubes operating on the low frequency voltage for approximately 120 degrees during one cycle. The anode-cathode circuits and grid-cathode circuits of the oscillation system are inductively coupled by the portion of inductance 19 between terminals 21 and 25 and 23 and 25 respectively. The constants of the oscillation circuit are so chosen that oscillations of the required high frequency are produced, and the high frequency power is transmitted to the furnace winding or similar load element 8.

No direct current flows in the power supply lines 4 to 6 and no ground point for such return direct current flow is required. No ground point is required for the lines 4 to 6 of the power supply line. Further no transformer, iron core reactor, or similar device is required to transmit power from the power supply line to the rectifying tubes, these tubes being connected respectively directly between the terminals 1 and 2, 2 and 3, and 3 and 1 of the different pairs of wires or lines 4 to 6, the reactors 15 keeping the oscillation circuit high frequency out of the power lines and the condensers 26 to 28 keeping the power line low frequency out of the tank circuit 18. Since the tubes are connected directly to the wire or line terminals 1 to 3 of the alternating current supply line, no phase windings are required to impress voltage from the supply line on the tubes.

The blocking capacitances 27 in the control electrode leads should be of relatively high reactance at 60 cycles with respect to the resistance of the grid leaks 17 and of relatively low reactance at the oscillation circuit high frequency with respect to the grid leak resistance, to prevent possible lowered efficiency of the system due to dephasing of the grid voltage with respect to the anode voltage at 60 cycles.

The operation of the form of the invention illustrated in Fig. 2 is similar to that of Fig. 1. In Fig. 2, however, since each of the terminals I, 2 and 3 of the supply line is connected to the anode of an additional tube the cathode of which is connected to the preceding instead of the following wire or line of the power supply line, each tube of the six comprising the two sets of tubes, thus spaced by their connection to the lines 4 to 6, operates with maximum output for approximately one-sixth of a given cycle or for 60 degrees during one cycle.

I have described my invention herein in particular embodiments for the purpose of illustration. It should be understood, however, that the invention may be variously changed and modified, and that by the appended claims I intend to cover such changes or modifications as are within the true spirit and scope of my invention.

What I claim as new and desire to secure by Letters Patent of the United States is:

1. In combination, an alternating current supply line, an oscillation generator to be energized from said supply line, said oscillation generator comprising a plurality of electron discharge devices each having a cathode, a grid, and an anode, said cathodes being connected respectively, directly to different sides of said line, said anodes being connected respectively each through a choke coil to sides of said line different from the sides to which the corresponding cathodes are connected, and means including an oscillation circuit having an intermediate point connected to said cathodes, a second point connected to said anodes, and a third point connected to said grids to generate oscillations by said discharge devices and to utilize said choke coils substantially to exclude said oscillations from said supply line.

2. In combination, an alternating current supply line, an oscillation generator to be energized from said line, said oscillation generator comprising a plurality of electron discharge devices each having a cathode, an anode, and a grid, said cathodes being connected respectively directly to different sides of said line, said anodes being connected respectively each through a choke coil to sides of said line different from the sides to which the corresponding cathodes are connected, an oscillation circuit having an intermediate point connected to all of said cathodes, a second point connected to all of said anodes, and a third point connected to all of said grids, and means utilizing said choke coils to prevent oscillations in said oscillation circuit from entering said alternating current supply line.

3. In combination, a three-phase alternating current supply line, terminals for each of the wire lines of said supply line, an oscillation generator to be energized from said supply line, said generator comprising six electron discharge devices each having a cathode and an anode and arranged in two sets of three of said devices each, each of the cathodes of one set being connected directly to a different one of said terminals and through a choke coil to the anode of the following device of said one set, each of the cathodes of the other set being connected to a different one of said terminals and through a high frequency choke coil to the anode of the preceding device of said other set, and means to generate oscillations by said discharge devices and to utilize said choke coils substantially to exclude said oscillations from said supply line.

4. In combination, a three-phase alternating current supply line, terminals for each of the wire lines of said supply line, an oscillation generator to be energized from said supply line, said generator comprising six electron discharge devices each having a cathode, an anode and a grid, said devices being arranged in two sets of three devices each, each of the cathodes of one set being connected directly to a different one of said terminals and through a choke coil to the anode of the following device of the said one set, each of the cathodes of the other set being connected to a different one of said terminals and through a choke coil to the anode of the preceding device of said other set, an oscillation circuit having an intermediate point connected to all of said cathodes, a second point connected to all of said anodes, and a third point connected to all of said grids, and means utilizing said choke coils to prevent oscillations in said oscillation circuit from entering said alternating current supply line.

5. In combination, an alternating current supply line, an oscillation generator to be energized from said supply line, said oscillation generator comprising a plurality of electron discharge devices, a set of electrodes constituted by a plurality of cathodes mounted respectively in different ones of said discharge devices, a second set of electrodes constituted by a plurality of anodes mounted respectively in different ones of said discharge devices, each of said discharge devices having a control grid, the electrodes of one of said sets being connected respectively directly to different sides of said line, the electrodes of the other set being connected respectively each through a choke coil to sides of said line different from said first-named sides, and means including an oscillation circuit having an intermediate point connected to said cathodes, a second point connected to said anodes, and a third point connected to said grids to generate oscillations by said discharge devices and to utilize said choke coils substantially to exclude said oscillations from said supply line.

6. In combination, an alternating current supply line, an oscillation generator to be energized from said supply line, said oscillation generator comprising a plurality of electron discharge devices, a set of electrodes constituted by a plurality of cathodes mounted respectively in different ones of said discharge devices, a second set of electrodes constituted by a plurality of anodes mounted respectively in different ones of said discharge devices, the electrodes of one of said sets being connected respectively directly to different sides of said line, the electrodes of the other set being connected respectively each through a choke coil to sides of said line different from said first-named sides, and a plurality of grids mounted respectively in different ones of said discharge devices, an oscillation circuit having an intermediate point connected to all of said cathodes, a second point connected to all of said anodes, and a third point connected to all of said grids, and means utilizing said choke coils to prevent oscillations in said oscillation circuit from entering said alternating current supply line.

GEORGE W. FYLER.